United States Patent [19]

Hayashi

[11] Patent Number: 4,720,824
[45] Date of Patent: Jan. 19, 1988

[54] INFORMATION READING APPARATUS WITH A LIGHT BEAM SCANNING TECHNIQUE

[75] Inventor: Asao Hayashi, Tokyo, Japan

[73] Assignee: Olympus Optical Co., Ltd., Tokyo, Japan

[21] Appl. No.: 808,824

[22] Filed: Dec. 13, 1985

[30] Foreign Application Priority Data

Dec. 28, 1984 [JP] Japan .................. 59-277749
Dec. 28, 1984 [JP] Japan .................. 59-277751

[51] Int. Cl.$^4$ ............ G11B 7/135; G11B 7/09; G02B 6/32
[52] U.S. Cl. ................. 369/44; 235/487; 369/112; 369/121; 350/96.13; 350/96.14
[58] Field of Search ........ 235/436, 466, 474, 487; 350/96.13, 96.14; 369/112, 121, 122, 44

[56] References Cited

U.S. PATENT DOCUMENTS

| | | | |
|---|---|---|---|
| 3,858,032 | 12/1974 | Scantlin | 235/474 |
| 4,145,758 | 3/1982 | Drexler et al. | |
| 4,237,375 | 12/1980 | Granholm | 235/466 |
| 4,360,728 | 11/1982 | Drexler | |
| 4,394,060 | 7/1983 | Verber et al. | 350/96.13 |
| 4,425,023 | 1/1984 | Matsumoto et al. | 350/96.14 |
| 4,523,803 | 6/1985 | Arao et al. | 350/96.13 |
| 4,544,835 | 10/1985 | Drexler | 235/487 |

FOREIGN PATENT DOCUMENTS 53-13819 7/1978 Japan .

OTHER PUBLICATIONS

IBM Technical Disclosure Bulletin, *Integrated Optic Read-Write Head*, vol. 15, No. 8, Jan. 1973.

Primary Examiner—Raymond F. Cardillo
Assistant Examiner—James Tomassini
Attorney, Agent, or Firm—Frishauf, Holtz, Goodman & Woodward

[57] ABSTRACT

An information reading apparatus for reading information includes a board having a plane optical waveguide and a light source on the board. Light beam emitted from the source is conducted by a first optical system to a predetermined direction through the waveguide. Part of the light beam is deffracted toward a second optical system by a surface elastic wave region formed in the waveguide. The second optical system conducts the light beam to an information recording region of a card through the waveguide and leads reflected light beam from the information recording region to a photodetector. The light beam not diffracted by the elastic wave region is conducted to a third optical system formed in the waveguide. The system conducts the light beam to a synchronizing signal recording region of the card and leads reflected light beam from the synchronizing signal recording region to a photodetector.

14 Claims, 24 Drawing Figures

F I G. 1
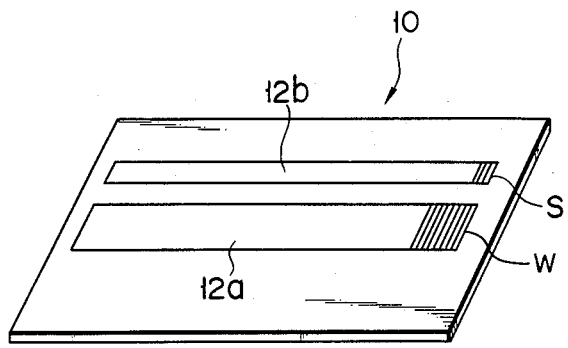
F I G. 2
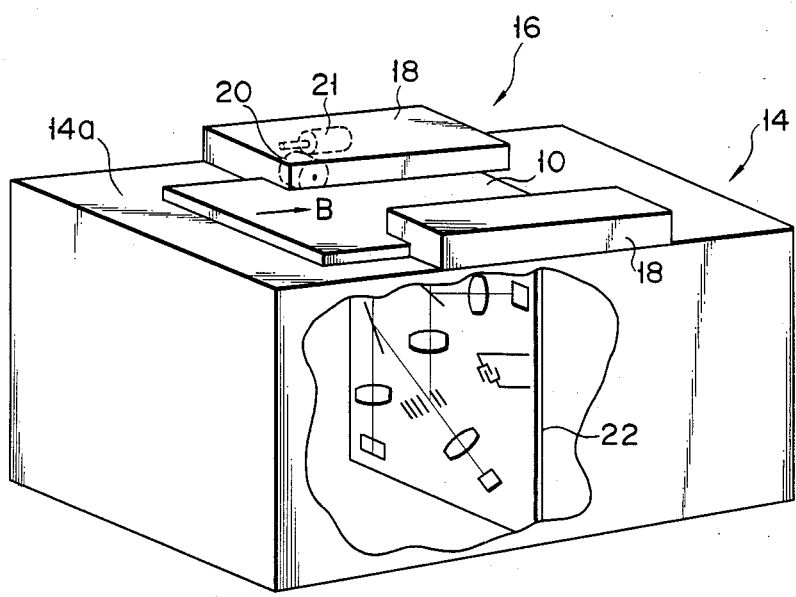

F I G. 11
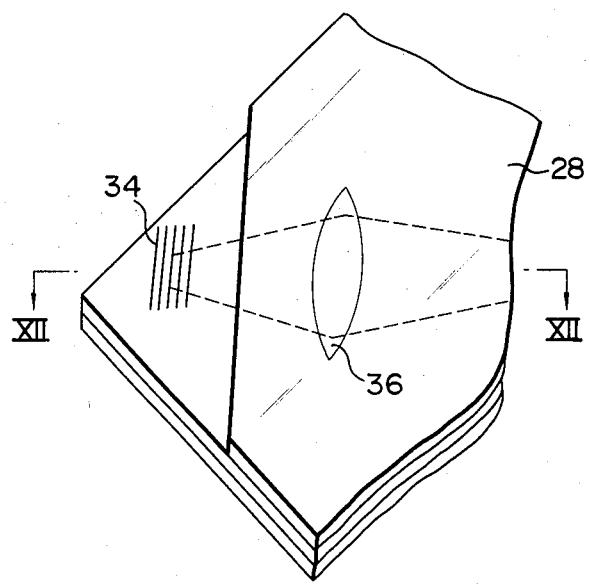
F I G. 12
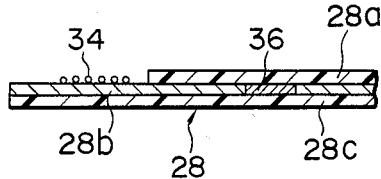
F I G. 13
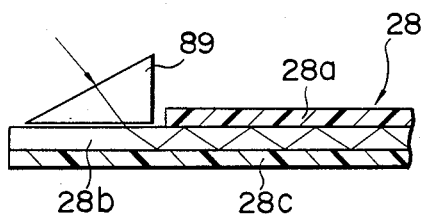
F I G. 14
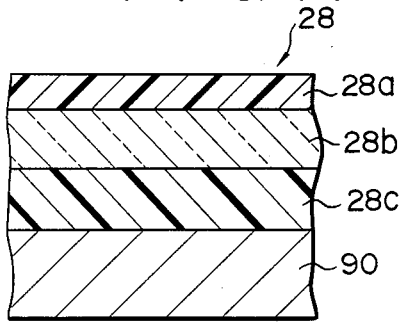
F I G. 15
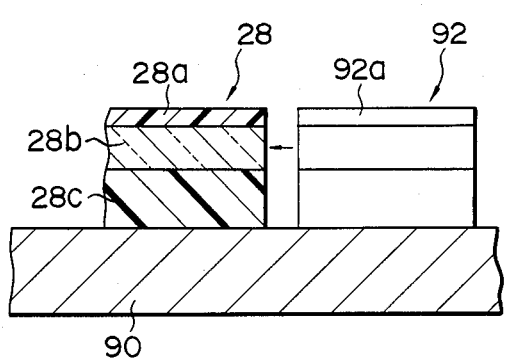

INFORMATION READING APPARATUS WITH A LIGHT BEAM SCANNING TECHNIQUE

BACKGROUND OF THE INVENTION

The present invention relates to an information reading apparatus, and more specifically to an optical information reading apparatus.

With the remarkable development of the information industry, information recording or reproducing (reading) apparatuses for recording or reproducing a variety of types of information have recently been put to practical use. Apparatuses have conventionally been proposed which record or reproduce information magnetically. The apparatuses of this type cannot, however, ensure prolonged retention of recorded information, making high-density recording difficult.

An apparatus for optically reproducing information is disclosed in U.S. Pat. No. 4,360,728. This apparatus comprises a condensing lens for converging light emitted from a laser beam source, and a pair of mirrors for reflecting the converged light to project it onto a card which bears information. The light applied to the card is reflected with a reflectivity which varies with the presence of pits or recorded data on the card. The reflected light is deflected by a half mirror, and then focused on a photodetector, such as a photodiode, by a focusing lens. Thus, the recorded data on the card is read or reproduced optically. For optical scanning of a recording region on the card, the paired mirrors are oscillated synchronously.

In the apparatus of the aforementioned construction, the optical system needs to be arranged in three dimensions, making the apparatus bulky as a whole and requiring a troublesome positional adjustment between members. Also, to permit oscillation of the mirrors requires complicated construction and expensive manufacturing.

Therefore, the inventor hereof has proposed a record information reading apparatus which employs a plane optical waveguide, in Japanese Patent Disclosure No. 53-13819. This apparatus comprises a grating for leading a light beam emitted from a light source to the waveguide, and an ultrasonic vibrator for producing a surface elastic wave region in the optical path of the beam. Part of the beam passing through the elastic wave region is refracted and converged on an end face of the waveguide by a converging lens. The angle of refraction of the light beam refracted by the elastic wave region is continuously changed by applying an AC signal voltage to the vibrator to vary the frequency of surface elastic waves in succession. Thus, the beam converged on the end face of the waveguide is shifted for primary scanning in a predetermined direction.

According to the apparatus described above, the optical system can enjoy a substantially plane configuration, and mirrors, unlike the ones employed in the aforementioned conventional apparatus, need not be mechanically oscillated. Accordingly, the whole structure of the apparatus can be made compact, the number of adjustments can be decreased, and the manufacturing cost can be reduced. In the apparatus of this type, however, synchronizing signals for determining the timing for the primary scanning are generated by an encoder which, mounted on a rotating body, would constitute a hindrance to further reduction in the size and cost of the apparatus.

SUMMARY OF THE INVENTION

The present invention is contrived in consideration of these circumstances, and is intended to provide an information reading apparatus permitting miniaturization and reduction of manufacturing cost.

In order to achieve the above object, an information reading apparatus according to the invention comprises a board having an optical waveguide and a scanning surface opposite a record medium; a light source; first and second photodetectors; a first optical system disposed in the waveguide, and adapted to apply light emitted from the light source to a synchronizing signal recording region of the record medium through the waveguide path and the scanning surface, and to lead reflected light from the synchronizing signal recording region to the first light sensing element, a second optical system disposed in the waveguide path, and adapted to apply the light emitted from the light source to an information recording region of the record medium through the waveguide path and the scanning surface, and to lead reflected light from the information recording region to the second light sensing element, ultrasonic generating means for generating a surface elastic wave in the optical path of the second optical system, the elastic wave serving to diffract part of the light passing through the second optical system toward the information recording region, and signal processing means adapted to drive the ultrasonic generating means in accordance with a synchronizing signal detected by the first light sensing element, thereby continuously changing the frequency of the surface elastic wave, and to pick out a signal from the second light sensing element in accordance with the synchronizing signal.

BRIEF DESCRIPTION OF THE DRAWINGS

FIG. 1 is a perspective view of a card on which information is recorded;

FIGS. 2 to 6G show an information reading apparatus according to a first embodiment of the present invention, in which FIG. 2 is a cutaway perspective view showing the whole of the apparatus, FIG. 3 is a plan view showing a plane optical system and a processing circuit, FIG. 4 is a perspective view showing part of the plane optical system, FIG. 5 is a sectional view taken along line V—V of FIG. 4, and FIGS. 6A to 6G are timing charts for illustrating the operation of the apparatus;

FIGS. 8 and 9 show an apparatus according to a third embodiment of the invention, in which FIG. 8 is a plan view showing a plane optical system and a processing circuit, and FIG. 9 is a sectional view of an optical waveguide;

FIGS. 11 and 12 show a modification of an optical waveguide lens, in which FIG. 11 is a perspective view of the lens, and FIG. 12 is a sectional view taken along line XII—XII of FIG. 11;

FIG. 13 is a sectional view showing a modification of the plane optical system;

FIGS. 14 and 15 are sectional views showing different modifications of a board;

DETAILED DESCRIPTION OF THE PREFERRED EMBODIMENTS

Figure 3:
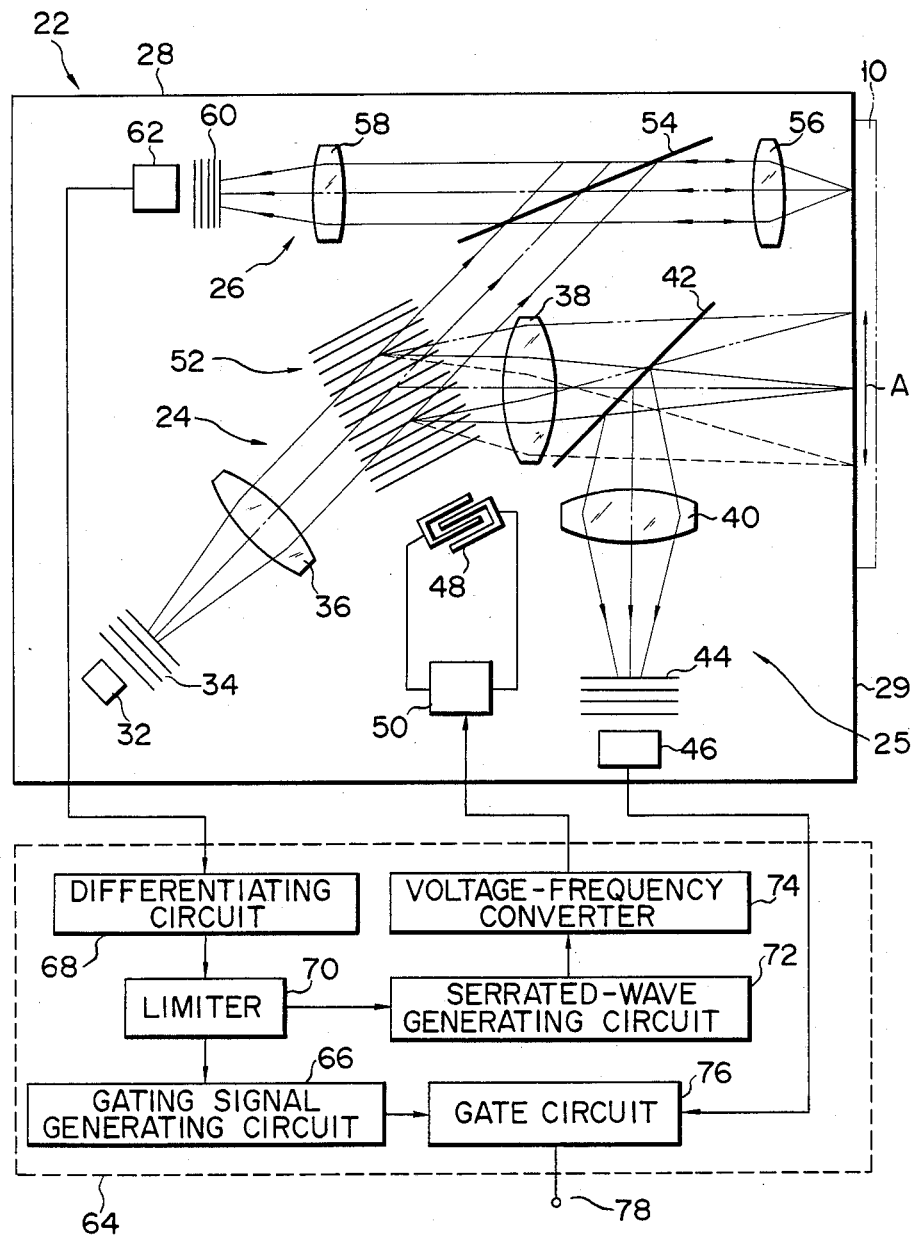

Several embodiments of the present invention will now be described in detail with reference to the accompanying drawings.

FIG. 1 shows card 10 as a record medium. Information track 12a and synchronizing signal track 12b are formed parallel to each other on card 10. Recording signals or information signals W are recorded on track 12a across the same. Synchronizing signals S corresponding to information recorded on track 12a are recorded on track 12b across the same to face signals W. In the other wards, each of signals S is formed on the extension of the corresponding information signal.

As shown in FIG. 2, an information reading apparatus for reading information from card 10 has box-shaped housing 14. Card feed mechanism 16 is provided on the top surface of housing 14 which forms guide surface 14a. Mechanism 16 includes a pair of parallel guide members 18, feed roller 20 in one member 18, and motor 21 for driving roller 20. When card 10 is placed on surface 14a, it is fed in the longitudinal direction of information track 12a by mechanism 16. Housing 14 contains therein plane optical system 22 for reading information from card 10 and a signal processing circuit (described later).

Figure 4:
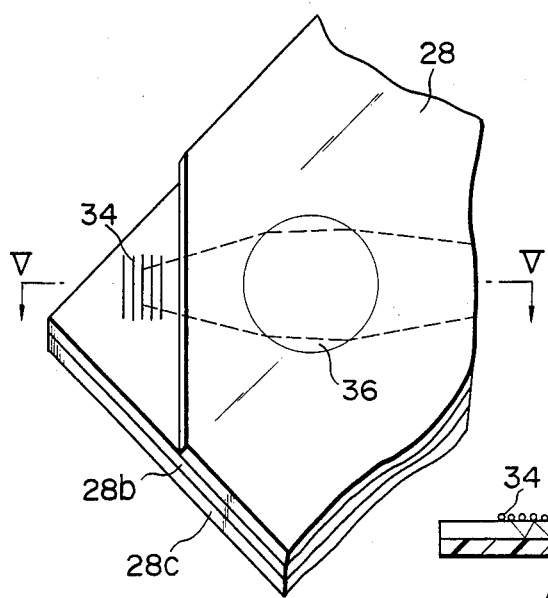
Figure 5:
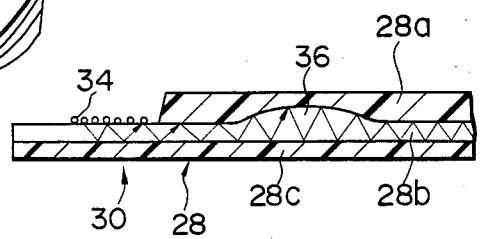

As shown in FIG. 3, system 22 includes illumination optical system 24, optical system 25 for reproducing information from card 10 and optical system 26 for detecting synchronizing signals S from card 10. These three optical systems are mounted on board 28. As shown in FIGS. 4 and 5, board 28 has a three-layer structure, consisting of upper, intermediate, and lower layers 28a, 28b and 28c. The intermediate layer is formed of a material with a refractive index higher than those of the upper and lower layers. For example, layer 28b is made of acrylic resin, and layers 28a and 28c of silicon. Thus, light beam incident on layer 28b is totally reflected by the interfaces between the three layers, and propagated through layer 28b. Namely, the intermediate layer defines optical plane waveguide 30 for transmitting light beam. Having flexibility, board 28 is bent when situated in housing 14, so that the reading apparatus can be made more compact as a whole. Alternatively, board 28 may be constructed by forming titanium (Ti) layers, as the upper and lower layers, above and below an intermediate layer made of lithium niobate (LiNbO$_3$), produced using the diffusion method or proton exchange method.

Also, board 28 has an end face which serves as scanning surface 29. Surface 29 is disposed flush with guide surface 14a of housing 14 and at right angles to the card feeding direction.

As shown in FIGS. 3 to 5, light source 32, such as a light emitting diode or semiconductor laser, is mounted on board 28. Optical system 24 includes grating 34 formed on the upper surface of intermediate layer 28b. Grating 34 leads a light beam emitted from light source 32 into waveguide 30. System 24 further includes optical waveguide lens 36 which serves as a collimator lens for collimating the light beam transmitted through grating 34. As shown in FIGS. 4 and 5, lens 36 is a Luneberg lens which is in the form of a convex-lens-shaped projection on the upper surface side of layer 28b. Optical system 25 includes lenses 38 and 40. Lens 38 is situated so that its optical axis is inclined at a predetermined angle to that of lens 36. Lens 38 serves as a converging lens for converging the incident beam on scanning surface 29 to form a beam spot thereon. If card 10 is located on scanning surface 29, that is, on guide surface 14a of housing 14, the beam converged by lens 38 is reflected by card 10. Half mirror 42 is disposed between lens 38 and surface 29, whereby the beam reflected by card 10 is deflected substantially at right angles to be projected onto lens 40 as a converging lens. The light beam converged by lens 40 is led to the outside of waveguide 30 by grating 44 on the upper surface of intermediate layer 28b. Further, the beam led out of path 30 is received by photodetector 46 mounted on board 28, and converted photoelectrically.

Ultrasonic vibrator 48 and ultrasonic drive circuit 50 are arranged on board 28. When a high-frequency signal is applied from circuit 50 to vibrator 48, the vibrator forms surface elastic wave region 52 within waveguide 30, between optical waveguide lenses 36 and 38. The light beam transmitted through lens 36 is partially diffracted as it passes through region 52, and is projected onto lens 38. Vibrator 48 is supplied with, for example, chirp signals from a sweep generator or the like whose frequency gradually increases or decreases. Thus, the oscillation frequency of ultrasonic waves generated by vibrator 48 varies, and the distance between sparse and dense portions of standing ultrasonic waves formed inside waveguide 30 is gradually reduced. Such a change of the standing waves produces the same result as is obtained when the optical grating interval is changed. Accordingly, the angle of the diffraction of the light beam passing through elastic wave region 52 changes, so that the beam is turned through an angular range corresponding to the change of the distance between sparse and dense portions. As a result, the incidence angle of the beam incident on lens 38 continuously changes.

Thus, the beam spot formed by lens 38 is moved for scanning within range A between a position indicated by two-dot and dash line and a position indicated by broken line, as shown in FIG. 3. Range A is as wide as the width of information track 12a of card 10. The scanning direction of the beam spot is parallel to the transverse direction of track 12a, and card 10 is transferred at right angles to the scanning direction (the direction perpendicular to the drawing plane of FIG. 3).

Optical system 26 for synchronizing signal detection includes half mirror 54 located on the optical axis of optical waveguide lens 36 of optical system 24, and converging lens 56 and condenser lens 58 disposed on either side of mirror 54. Lenses 56 and 58 are each formed of an optical waveguide lens, such as a Luneberg lens. Among the light beam passing through elastic wave region 52, a zero-order beam advances without being diffracted by region 52 and falls on mirror 54. After it is reflected by mirror 54, the beam is converged on scanning surface 29 by converging lens 56. If card 10 is on surface 29, the converged beam is reflected by synchronizing signal track 12b of the card, and projected on condenser lens 58 through half mirror 54. The beam condensed by lens 58 is removed from board 28 by grating 60 which is formed on the upper surface of intermediate layer 28b. The beam is then received by photodetector 62 on board 28 and photoelectrically converted.

Figure 6:
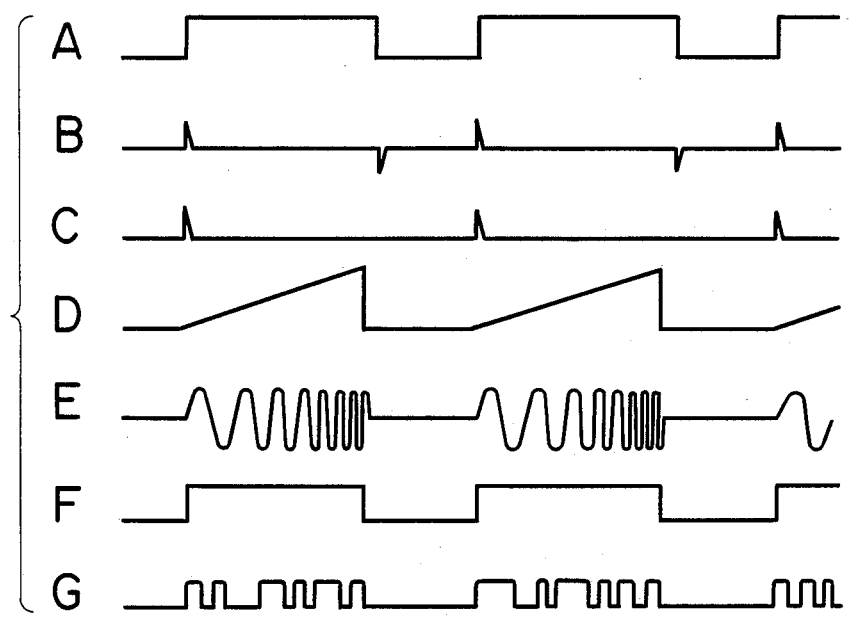

Processing circuit 64 is provided for processing the output signals of photodetectors 46 and 62. Circuit 64 includes a differentiating circuit 68 for differentiating photoelectric conversion signals as output from element 62. When synchronizing signals S recorded on card 10 are detected by photodetector 62 and photodetector 62 outputs signals corresponding to signals S as shown in FIG. 6A, circuit 68 detects the leading and trailing edges of the signals from photodetector 62, as shown in FIG. 6B. Then, positive signals from circuit 68 are picked out by limiter 70, as shown in FIG. 6C, and applied as synchronizing signals to the input of serrated wave generating circuit 72. Circuit 72 produces serrated waves, as shown in FIG. 6D, which are supplied to V-f converter 74 (voltage-frequency converter). Converter 74 produces chirp signals whose frequency varies with voltage, as shown in FIG. 6E. The chirp signals are applied to ultrasonic drive circuit 50. An output voltage from circuit 50 serves to drive ultrasonic vibrator 48. Thus, vibrator 48 is driven in accordance with the timing for the detection of synchronizing signals S.

Also, limiter 70 delivers synchronizing signals to gating signal generating circuit 66, which produces gating signals (FIG. 6F) while the serrated waves are being produced (or while the information signal is being read from card 10). The gating signals are applied to gate circuit 76, whose gate is kept open while the gating signals are at a high level, so that the output of photodetector 46 is delivered to output terminal 78.

Thus, output terminal 78 is supplied with signals corresponding to the recorded information, as shown in FIG. 6G. These signals are amplified, shaped, and then reproduced.

The operation of the reading apparatus, constructed in this manner, will now be described.

First, card 10 is placed on guide surface 14a of housing 14 so that information and synchronizing signal tracks 12a and 12b are on the underside, and the card is then fed in the direction of arrow B (FIG. 2) by feed mechanism 16. At the same time, light source 32 is turned on. A light beam from source 32 is diffracted by grating 34 and introduced into intermediate layer 28b of board 28. The beam is collimated by lens 36 and then passes through elastic wave region 52. At this time, a primary diffracted beam is projected on lens 38. The zero-order beam, which is not diffracted by region 52, becomes incident on half mirror 54. After it is reflected by mirror 54, the zero-order beam is condensed by lens 56 and projected on track 12b of card 10. Reflected by track 12b, the beam is transmitted through lens 56 and mirror 54, and then condensed by lens 58 becoming incident on grating 60. The light beam incident on grating 60 is received by photodetector 62. If irradiated track 12b includes any portion in which synchronizing signals S is recorded, photodetector 62 delivers pulse signals as shown in FIG. 6A. These pulse signals are differentiated by differentiating circuit 70, and then delivered as synchronizing signals via limiter 72. Serrated waves are produced in response to the synchronizing signals, and converted into chirp signals by V-f converter 74. The chirp signals are applied to ultrasonic drive circuit 50, and ultrasonic vibrator 48 delivers ultrasonic waves in response to output from circuit 50.

As the frequency of the ultrasonic waves varies, the distance between sparse and dense portions of the standing waves formed inside elastic wave region 52 gradually becomes shorter. Therefore, the light beam is diffracted with an increasing angle of diffraction by region 52, and is projected on lens 38. Thus, the beam spot formed on scanning surface 29 of board 28 by lens 38 serves as a means for scanning information track 12a of card 10 across its width.

The light beam reflected by information track 12a is led out of board 28 via half mirror 42, lens 40, and grating 44, and received by photodetector 46. If any information is recorded in track 12a, the quantity of reflected light from track 12a makes a change, which is delivered as an information signal from photodetector 46. While the scanning is being performed in response to the synchronizing signals, gate circuit 76 is open, so that the output from photodetector 46 is applied to the input of a signal processing system (not shown) through output terminal 78. Thus, the information signal optically recorded on card 10 is reproduced.

As described above, when card 10 is fed in the predetermined direction and the light beam from the reading apparatus reaches card 10 to form a beam spot on that portion of information track 12a bearing the information, the synchronizing signals recorded on card 10 are detected in response to the information, and the diffracted light beam is driven for scanning in accordance with the signal detection. Thus, the information recorded in information track 12a is read.

According to the reading apparatus constructed in this manner, the means for detecting synchronizing signals, like its counterpart on the signal reproduction side, consists of a plane or substantially plane optical system without a rotary encoder or any other moving mechanism. Therefore, the apparatus, as a whole, can be made compact. Moreover, the absence of moving mechanisms reduces noise, improves durability, and increases reading speed. Since most of the members of the optical systems are formed on the board, it is possible to provide high-reliability apparatuses with reduced manufactural variations, without requiring positional adjustment between the members. The plane optical system can be manufactured by the replica method or lithography, permitting mass production and reduced in manufacturing cost.

Light source 32 for information reproduction doubles as a light source for synchronizing signal detection. In other words, part of the light beam from source 32 is diffracted and used for reproduction, while the undiffracted beam portion functions for signal detection. Thus, the light emitted from the light source can more effectively be utilized, resulting in lower power consumption. In the first embodiment, plane optical system 22 is positioned at right angles to card 10. Since board 28 is very thin and flexible, however, it can be bent smoothly when it is inserted in housing 14. By doing this, the apparatus can be further improved in compactness.

Figure 7:
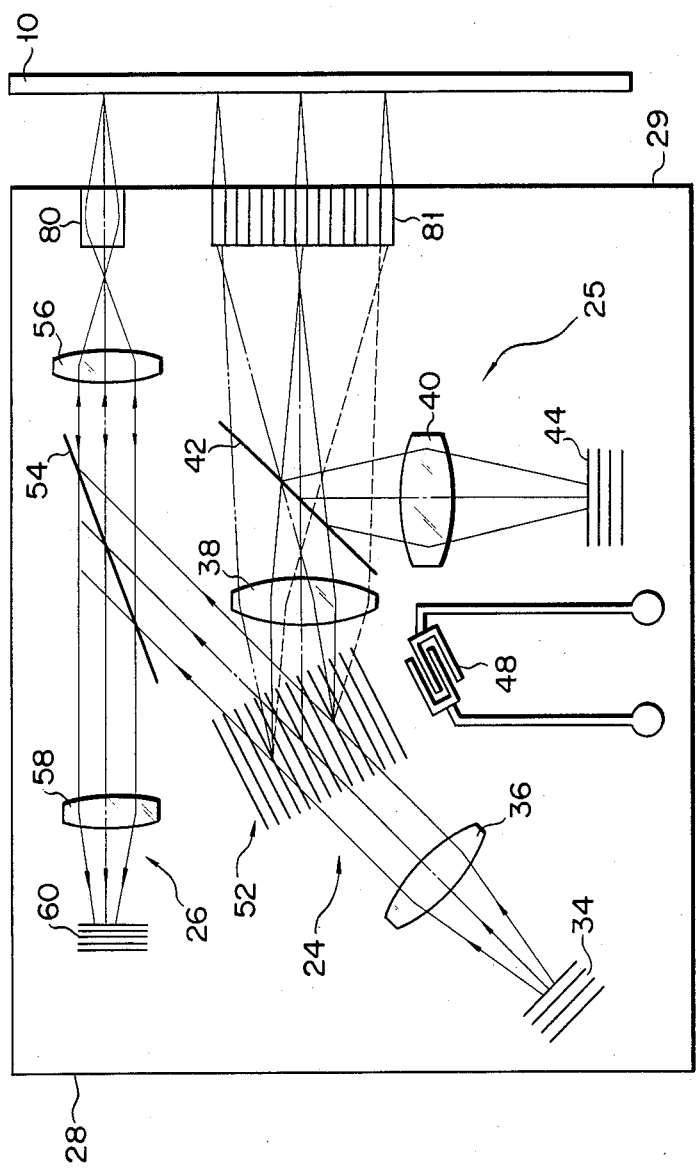
FIG. 7 is a plan view of a plane optical system of an apparatus according to a second embodiment of the invention.

FIG. 7 shows a second embodiment of the present invention.

According to the first embodiment, card 10 is fed in contact with scanning surface 29 of board 28. According to the second embodiment, however, arrays 80 and 81 of Selfoc lenses (trademark; distributed-index lenses) are arranged on scanning surface 29 of board 28, and card 10 is fed untouched by the scanning surface.

Lens array 80 is located on the optical axis of optical system 26 for synchronizing signal detection, adjoining scanning surface 29. Array 80 serves to converge the light beam from lens 56 on synchronizing signal track 12b of card 10. Lens array 81 is located between card 10 and half mirror 42 of optical system 25 for reproduction, adjoining surface 29. Each lens element of array 81 converges the beam from mirror 42 to form a beam spot on information track 12a of card 10, and condenses and leads the reflected light beam from track 12a onto mirror 42.

The number of lens elements of array 81 is equal to the maximum number of pits which are arranged in the scanning direction or across the width of track 12a. Array 80 may be formed of a single Selfoc lens if it is expected only to detect the presence of synchronizing signals.

Other arrangements of the second embodiment are the same as those of the first embodiment, and their description is omitted herein.

Instead of using the Selfoc lenses, in the second embodiment, the optical systems may be disposed so that the positions on which the light beams are converged by lenses 38 and 56 are located outside (or on the right side of FIG. 3) of scanning surface 29 of board 28. Also with this arrangement, card 10 may be fed untouched by surface 29 when the information is read from the card.

Figure 8:
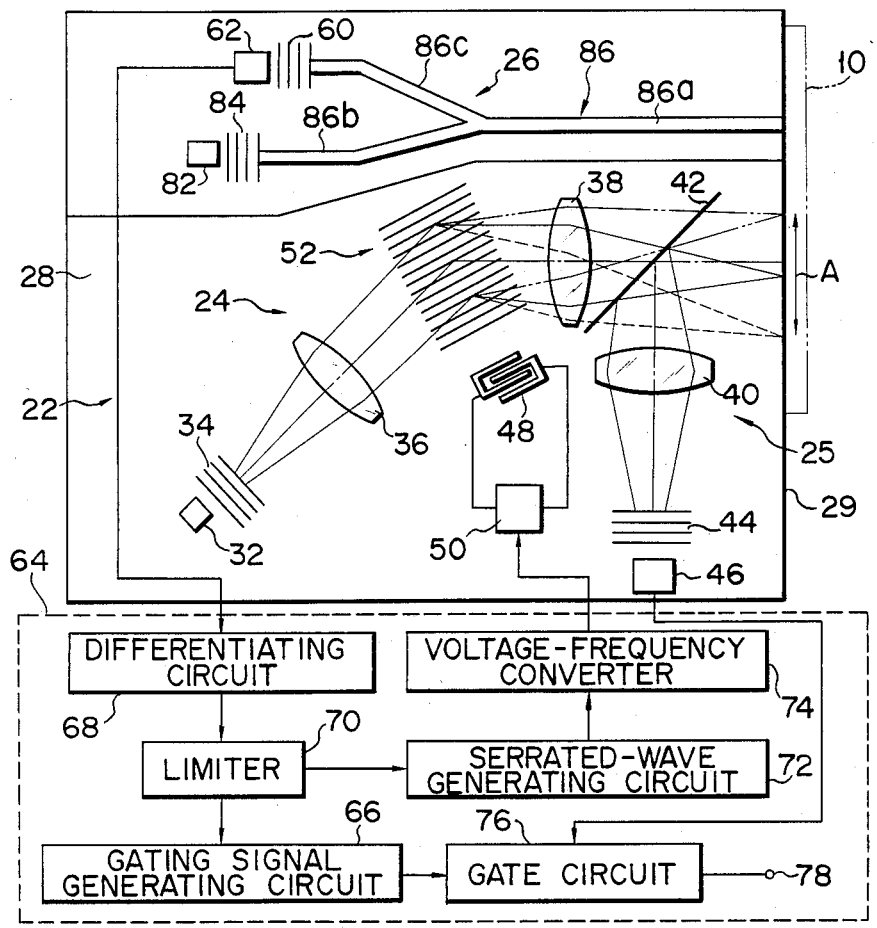
Figure 9:
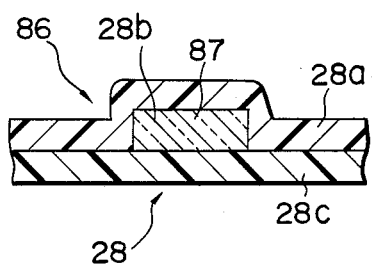

FIGS. 8 and 9 show a third embodiment of the present invention. According to this embodiment, optical system 26 for synchronizing signal detection uses a ribtype optical waveguide in place of the plane waveguide, and an exclusive light source for optical system 26 is additionally provided.

Light source 82 is mounted on board 28, and a light beam from source 82 is introduced into rib-type optical waveguide 86 through grating 84. As shown in FIG. 9, waveguide 86 is formed by etching intermediate layer 28b of board 28 to remove all of layer 28b except the region which constitutes core portion 87 of the waveguide, and then covering portion 87 and lower layer 28c with upper layer 28a or a cladding layer having a lower refractive index. Optical waveguide 86 is substantially Y-shaped, including common path 86a one end of which extends to scanning surface 29 of board 28, and a pair of branch paths 86b and 86c diverging from the other end of the common path. The beam from light source 82 passes through branch path 86b and common path 86a to reach scanning surface 29. After it is reflected by synchronizing signal track 12b (FIG. 1) of card 10 in contact with surface 29, the beam passes again through common path 86a. At the same time, part of the beam goes along branch path 86c to fall on grating 60. The beam incident on grating 60 is received by photodetector 62 for photoelectric conversion, and the resulting signal is delivered to processing circuit 64.

The arrangements of optical systems 24, 25 and processing circuit 64 are the same as those of the first embodiment, and their description is omitted herein. In the third embodiment, as in the first embodiment, the synchronizing signals can be detected without using a rotary encoder or any other moving mechanism. Therefore, the apparatus can be made compact design, as a whole, and more quiet. The apparatus also features, improved durability and a faster reading speed.

Figure 10:
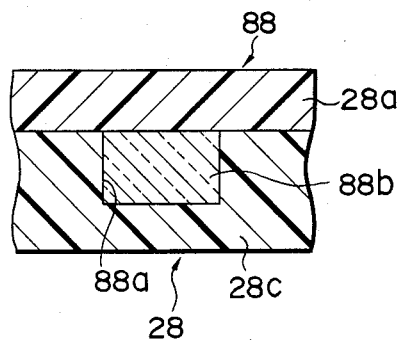
FIG. 10 is a sectional view showing a modification of the optical waveguide.

In the third embodiment, the optical waveguide of optical system 26 for synchronizing signal detection is not limited to the rib type as shown in FIG. 9, and may alternatively be of a channel type, as shown in FIG. 10. Channel-type waveguide 88 is formed by cutting groove 88a in lower layer 28c of board 28, then forming core portion 88b with a higher refractive index in groove 88a, and finally covering layer 28c and portion 88b with upper layer 28a.

Although a Luneberg lens is used for the waveguide lens in the embodiments described above, the present invention is not limited to the embodiments. As shown in FIGS. 11 and 12, for example, the waveguide lens may consist of a mode index lens. The mode index lens is formed by arranging that region in intermediate layer 28b which has a refractive index higher than that of intermediate layer 28b and has a convex lens-shape bulging in the direction of light transmission. Alternatively, part of layer 28b may be dented or bulged to form a geodesic lens.

In the foregoing embodiments, moreover, a grating is used as means through which the light beam is taken out of or introduced into the optical waveguide. However, it may be replaced with rutilated prism 89, as shown in FIG. 13.

Board 28 is not limited to the aforementioned three-layer structure, and may alternatively be constructed as shown in FIG. 14. In this case, board 28 consists of a silicon substrate 90 and three quartz-based layers thereon. The three layers include buffer layer 28c as a lower layer with a low refractive index, core layer (intermediate layer) 28b as a waveguide portion with a high refractive index, and cladding layer 28a as an upper layer with a low refractive index. Waveguide portion 28b is formed by the direct flame deposit method using SiCl4 or TiCl4 gas as a basic gas.

With board 28 constructed in this manner, the distance between waveguide portion 28b and silicon substrate 90 can be adjusted by changing the thickness of buffer layer 28c. It is therefore possible to bury photodetectors, light emitting elements, etc., in part of the plane waveguide. In this case, these detectors and elements may be arranged in place of gratings, since no grids are required. Alternatively, the detectors and elements may be formed integrally on substrate 90.

In a modification shown in FIG. 15, light emitting element 92 is provided on silicon substrate 90 without the use of any grating. A light beam emitted from light emitting layer 92a of element 92 falls on core portion 28b of board 28 which faces layer 92a.

Figure 16:
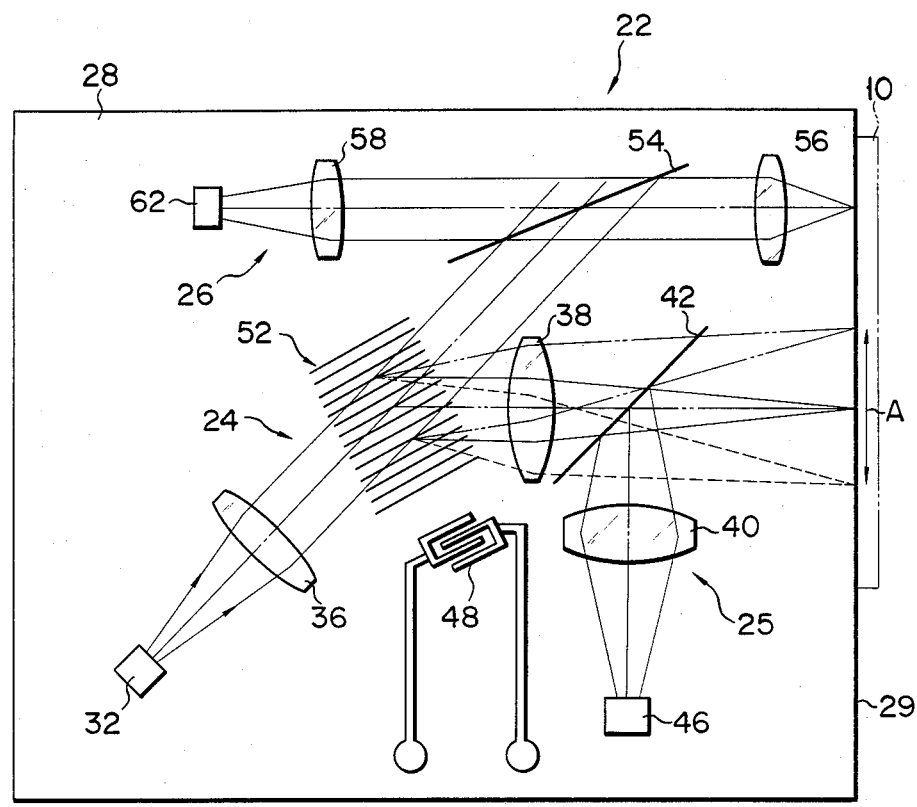
FIG. 16 is a plan view of a plane optical system of an apparatus according to a fourth embodiment.

FIG. 16 shows a fourth embodiment of the present invention. In this embodiment, no grating is provided, and photodetectors 46 and 62 and light emitting element 32 are formed on a silicon substrate.

Figure 17:
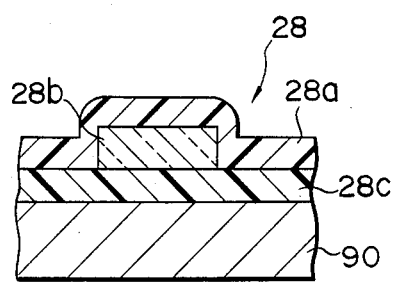
FIGS. 17 and 18 are sectional views showing different modifications of the optical waveguide.
Figure 18:
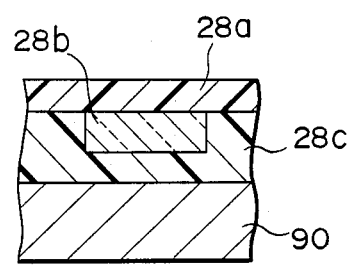

The rib- or channel-type optical waveguide shown in FIG. 17 or 18 may be formed with use of board 28 shown in FIG. 14.

When fabricating a board including an optical waveguide with use of a silicon substrate, an electric circuit may be formed on the same substrate. Even if the substrate is not formed of silicon, the electric circuit may be converted into an IC version and united with the waveguide by means of a bonding agent or the like.

In the foregoing embodiments, the primary diffracted beam is used for scanning the information signals. Alternatively, however, a negative primary diffracted beam or a diffracted beam of a second or higher order may be used for that purpose. For secure information scanning with a higher signal-to-noise ratio, moreover, a single-wavelength laser with a narrow bandwidth, such as a semiconductor laser, is preferred as a light source to a light emitting diode. When leading only a single-wavelength beam to the waveguide by means of a diffraction grating or the like, however, a light emitting diode may be used as the light source.

It is to be understood that the reading apparatus of the present invention is not limited to the use with a card on which synchronizing signals and information are recorded, and that it may also be applied to any other record media. For example, the apparatus of the invention may be applied to an optical disk as a rotating record medium. In this case, it is unnecessary to oscillate light for information reproduction. In other words, there is no need for scanning and hence for means of ultrasonic generation.

What is claimed is:

1. An information reading apparatus for reading information from a record medium having an information recording region in which the information is recorded, and a synchronizing signal recording region in which synchronizing signals corresponding to the information are recorded comprising:
   a board having an optical waveguide and a scanning surface opposite the record medium;
   emitting means for emitting light into the optical waveguide in a predetermined direction;
   first and second photodetecting means;
   ultrasonic generating means for generating a surface elastic wave in an optical path of the light emitted from the emitting means to diffract with said elastic wave part of the light emitted from the emitting means;
   a first optical system formed in the board, for conducting the light beam diffracted by the elastic wave to the information recording region of the record medium, through the wave guide and the scanning surface, and leading a reflected light beam from the information recording region to the first photodetecting means;
   a second optical system formed in the board, for conducting to the synchronizing signal recording region of the record medium, through the waveguide and the scanning surface, a part of the light beam emitted by the emitting means and not diffracted by the elastic wave and leading a reflected light beam from the synchronizing signal recording region to the second photodetecting means; and
   signal processing means for driving the ultrasonic generating means in accordance with a synchronizing signal detected by the second photodetecting means to continuously change the frequency of the surface elastic wave during a given time period, and for enabling a signal from the first photodetecting means in accordance with the synchronizing signal.

2. The reading apparatus according to claim 1, wherein said optical waveguide is a plane optical waveguide.

3. The reading apparatus according to claim 2, wherein said board includes an intermediate layer having a predetermined refractive index and defining the plane optical waveguide, and upper and lower layers having a refractive index lower than that of the intermediate layer and formed on the upper and lower surfaces, respectively, of the intermediate layer.

4. The reading apparatus according to claim 2, wherein said emitting means includes a light source and an optical waveguide lens for collimating the light emitted from the light source, said first optical system includes a first optical waveguide lens for converging the light beams diffracted by the surface elastic wave on the information recording region of the record medium, a deflecting member for deflecting the reflected light beam from the information recording regon, and a second optical waveguide lens for converging the deflected light beam on the first photodetecting means, said three optical waveguide lenses being formed in the optical waveguide.

5. The reading apparatus according to claim 4, wherein said second optical system includes a reflecting member for reflecting the light beam not diffracted by the surface elastic wave, a first optical waveguide lens for converging the reflected light beam on the synchronizing signal recording region, and a second optical waveguide lens for converging the light beam from the synchronizing signal recording region on the second photodetecting means, said first and second waveguide lenses of the second optical system being formed in the optical waveguide.

6. The reading apparatus according to claim 1, wherein said scanning surface of the board is spaced apart from the record medium by a predetermined distance, said first optical system includes a first lens array for converging the light beam diffracted by the elastic wave on the information recording region of the record medium, and said second optical system includes a second lens array for converging the light beam not diffracted by the elastic wave on the synchronizing signal recording region of the record medium.

7. The reading apparatus according to claim 1, wherein said first and second photodetecting means are mounted on the board.

8. The reading apparatus according to claim 1, wherein said ultrasonic generating means includes an ultrasonic vibrator and an ultrasonic drive circuit for driving the vibrator, and said signal processing means includes means for supplying the ultrasonic drive circuit with chirp signals whose frequency continuously varies according to the output of the second photodetecting means.

9. The reading apparatus according to claim 8, wherein said supply means includes a differentiation circuit for differentiating the output of the second photodetecting means to detect the leading and trailing edges of the output, a limiter for picking out a positive signal from the output of the differentiation circuit and delivering a signal as a synchronizing signal, a serrated wave generating circuit for producing serrated waves in accordance with the output of the limiter, and a voltage-frequency converter, for producing chirp signals in response to the serrated waves and applying the chirp signals to the ultrasonic drive circuit, and said signal processing means includes a gating signal generating circuit for producing gating signals in accordance with the output of the limiter, and a gate circuit for picking out the output of the first photodetecting means in accordance with the gating signals.

10. An information reading apparatus for reading information from a record medium having an information recording region in which the information is recorded and a synchronizing signal recording region in which synchronizing signals corresponding to the information are recorded, comprising:
   a board havng an optical waveguide and a scanning surface opposite the record medium;
   means for emitting a light into the optical waveguide in a predetermined direction;
   first and second photodetecting means provided at the board;
   means for dividing the light from the emitting means into a first light beam and a second light beam;

means for scanning the first light beam within a range corresponding to a width of the information recording region;

a first optical system formed in the board, for conducting the first light beam to the information recording region of the record medium, though the waveguide and the scanning surface, and leading a reflected light beam from the information recording region to the first photodetecting means;

a second optical system formed in the board, for conducting the second light beam to the synchronizing signal recording region of the record medium, through the waveguide and the scanning surface, and leading a reflected light beam from the synchronizing signal recording region to the second photodetecting means; and signal processing means for driving the scanning means in accordance with a synchronizing signal detected by the second photodetecting means, and for enabling a signal from the first photodetecting means in accordance with the synchronizing signal.

11. The reading apparatus according to claim 10, wherein said dividing means comprises an optical grating, and wherein said scanning means includes a surface elastic wave region and an ultrasonic generating means for generating a surface elastic wave in said region in an optical path of the light emitted from the emitting means, said optical grating being mounted on the surface elastic wave region such that it diffracts the first light beam by an angle dependent on the surface elastic wave, and wheren said signal processing means includes means for continuously changing the frequency of the surface elastic wave, and in accordance with the synchronizing signal.

12. An information reading apparatus for reading information from a record medium having an information recording region in which the information is recorded, and a synchronizing signal recording region in which synchronizing signals corresponding to the information are recorded, comprising;

a board having an optical waveguide and a scanning surface opposite the record medium;

first and second emitting means for emitting light into the waveguide of the board;

first and second photodetecting means;

ultrasonic generating means for generating a surface elastic wave in an optical path of the first optical system, to diffract with said elastic wave at least part of the light emitted from the first emitting means; and a first optical system formed in the board, for conducting the light beam diffracted by the elastic wave to the information recording region of the recording medium, through the waveguide and the scanning surface, and leading a reflected light beam from the information recording region to the first photodetecting means;

a second optical system formed in the board, for conducting light emitted from the second emitting means to the synchronizing signal recording region of the record medium, through the waveguide and the scanning surface, and leading a reflected light beam from the synchronizing signal recording region to the second photodetecting means; and signal processing means for driving the ultrasonic generating means in accordance with a synchronizing signal detected by the second photodetecting means to continuously change the frequency of the surface elastic wave during a given time period, and for enabling a signal from the first photodetecting means in accordance with the synchronizing signal.

13. The reading apparatus according to claim 12, wherein the first optical system includes a plane optical waveguide on said board, and wherein the second optical system comprises an optical waveguide having an elongated core for guiding the light emitted from the second emitting means.

14. The reading apparatus according to claim 13, wherein said core has a substantially Y-shape and includes a common portion one end of which extends to the scanning surface of the board, and a pair of branch portions diverging from the other end of the common portion, and extending to the second emitting means and second photodetecting means, respectively.

* * * * *